(12) United States Patent
Trujillo et al.

(10) Patent No.: US 10,528,047 B1
(45) Date of Patent: Jan. 7, 2020

(54) METHOD AND SYSTEM FOR MONITORING USER ACTIVITY

(71) Applicants: Chongqing Jinkang New Energy Automobile Co., Ltd., Chongqing (CN); SF Motors Inc., Santa Clara, CA (US)

(72) Inventors: Edgar Trujillo, Santa Clara, CA (US); Jaime Camhi, Santa Clara, CA (US)

( * ) Notice: Subject to any disclaimer, the term of this patent is extended or adjusted under 35 U.S.C. 154(b) by 0 days.

(21) Appl. No.: 16/264,557

(22) Filed: Jan. 31, 2019

(51) Int. Cl.
| | |
|---|---|
| *G08B 21/06* | (2006.01) |
| *G05D 1/00* | (2006.01) |
| *G06K 9/00* | (2006.01) |
| *G06N 3/08* | (2006.01) |
| *B60W 40/02* | (2006.01) |
| *B60W 40/09* | (2012.01) |

(52) U.S. Cl.
CPC .......... *G05D 1/0061* (2013.01); *B60W 40/02* (2013.01); *B60W 40/09* (2013.01); *G06K 9/00845* (2013.01); *G06N 3/08* (2013.01)

(58) Field of Classification Search
CPC .. G05D 1/0221; G05D 1/0225; G05D 1/0246; G05D 1/0257; G05D 1/027; G05D 1/0274; G05D 1/0278; G05D 2201/0213; G08G 1/161; G08G 1/163; G08G 1/164; G08G 1/165; G08G 1/166; G08G 1/167

USPC ....... 340/439, 436, 435, 431, 447, 463, 516, 340/521, 539.22, 539.1, 636.19, 686.6, 340/5.2
See application file for complete search history.

(56) References Cited

U.S. PATENT DOCUMENTS

| | | | |
|---|---|---|---|
| 9,558,414 B1* | 1/2017 | Schmidt | B60W 40/08 |
| 2005/0060069 A1* | 3/2005 | Breed | B60N 2/2863 701/408 |
| 2016/0214618 A1* | 7/2016 | Wulf | B60W 40/08 |
| 2017/0355377 A1* | 12/2017 | Vijaya Kumar | B60W 40/08 |
| 2017/0368936 A1* | 12/2017 | Kojima | B60K 28/06 |

* cited by examiner

*Primary Examiner* — Daniel Previl
(74) *Attorney, Agent, or Firm* — Kilpatrick Townsend & Stockton

(57) ABSTRACT

Embodiments provide a method and system for monitoring user activity in a vehicle. A first sensor in the vehicle acquiring current activity data regarding the user. A second sensor in the vehicle can acquire environment data regarding an environment surrounding the user. A first set of classifiers can generate key point data regarding the user, which indicates body hand/eye movement points of the user. A second set of classifiers can assign the current activity to the activity group. A storage can store response information regarding a user, which includes mappings between activity groups and corresponding response time duration for the user to regain control of the vehicle. The system can generate a take-over request for the user to regain control of the vehicle based on the mapping and current activity.

20 Claims, 8 Drawing Sheets

METHOD AND SYSTEM FOR MONITORING USER ACTIVITY

FIELD OF THE INVENTION

This invention relates generally to method and system for monitoring user activity in a vehicle.

BACKGROUND OF THE INVENTION

Autonomous driving vehicles will become more and more popular in the near future. It is important that there is a system in place in the autonomous driving vehicles to handle transition from self-driving mode to user driving mode. For example, certain situations may arise during the autonomous driving phase that require a human's attention. For instance, the vehicle may be passing through a school zone, and under regulation, autonomous driving in the school zone is not permitted. Under such a situation, a human is required to regain control of the vehicle. That is, complete autonomous driving is not possible in all situations in the future. a challenge for addressing this is how to ensure a human in the autonomous driving vehicle is alert and ready to regain the control of the vehicle when such a situation arises.

Different solutions have been proposed to address the transition from autonomous driving to manual driving. For example, Tesla Autopilot system requires the user to touch the steering wheel and apply a mild torque every 1 minute or so. Cadillac's Super Cruise system monitors the user's eye gaze using a camera, and requires the user to look out the windshield every 15 seconds for the system to continue operation. Both systems start warning the user after their pre-set timeframes, and if these warnings are ignored, the system escalates the warnings until it deactivates the self-driving mode. These systems do not take into account personal performance or the different activities a user might be engaged while the vehicle is in self-driving mode. Some other systems employ other means to determine user's drowsiness level in order to recommend a stopover or rest time, but do not take any active mitigating measures.

BRIEF SUMMARY OF THE INVENTION

The invention proposed is a method and system to classify user activities into different activity groups based on users' reaction time to a takeover request given in the form of varying stimuli, e.g., acoustic, visual, haptic, which will then allow the system to notify the user to regain control of driving at the precise time and with the most effective take over request stimulus based on the user's current activity group. This will allow the system to create a takeover strategy that is self-learning and tuned to the specific activities and cognitive abilities of each individual user.

In some embodiments, the system in accordance with the disclosure can include one or more cameras and/or sensors. In one embodiment, the system uses data frames captured by a camera to identify when the user has regained complete control of the driving task by utilizing a provided convolutional neural network. This convolutional neural network can be configured to return real time human body and hand key points data for each frame. If the autonomous driving system requires the user to regain control soon, the system can initiate a takeover request and alert the user with an accompanying baseline stimulus signal, such as visual stimulus.

In some embodiments, when a takeover request signal is sent by the system, an initial time reference, time t, will be set, and the system will analyse the data returned by the convolutional neural network. The data returned by the system will be used to calculate when the user's hands returned to the steering wheel and when the user was ready to make a vehicle maneuverer. In those embodiments, once the system concludes the user regains control of the vehicle, the system will stop the timer and calculate the difference, $\Delta t$, from initial takeover request signal to when the vehicle was under total control. After the system has a recorded reaction time as a reference, the system can be configured to classify the previous X number of frames before the takeover request to the corresponding activity group when given that specific takeover request stimulus. This is possible because the system can conclude that the human body and hand key points detected in a series before the takeover request was sent produces the recorded reaction time when given a takeover request stimulus in the form of a visual alert.

In some embodiments, the system may have a neural network that has predictive and self-learning capabilities. The provided neural network classifier will be trained to analyse the human body and hands key points data returned by the convolutional neural network and classify the key points data to their corresponding activity groups. This is achieved by applying this neural network classifier at runtime. The system can see repetitive data from previously captured frames and reaction times that will indicate the current live key points belong to a certain activity group. After the system has predicted what activity group the user is currently in, through self-learning, the system can predict the most effective take over request stimulus for that activity group.

In some embodiments, the system can initially use a default average user reaction time for different activity groups when given a visual takeover alert as a baseline. In those embodiments, using this baseline as a reference, the system may alternate between using the baseline stimulus to acoustic or haptic stimulus, and analyse the difference in reaction time for each stimulus. Before a takeover request signal is sent, some environment data such as sound level inside cabin, time of day, street type (highway or residential) will also be captured. In those embodiments, after each successful takeover completed by the user, the system can update the mean average reaction time for that activity group with the selected takeover stimulus, and input the environment data captured to the database and update the classifier by retraining it with the latest updated data. After the classifier is retrained, the system can determine a user reacts more effectively to each individual activity group with a specific stimulus when considering the environment data. For example, after the classifier is retrained, the system can determine a user reacts more effectively at night on the highway to activity group 4 when given an acoustic takeover request stimulus. This ensures the classifier is constantly improving itself after every iteration and establishes a reference reaction time plus an effective stimulus signal that the system can utilize in case a takeover request is needed to get the user back to driving most effectively.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

DETAILED DESCRIPTION OF THE INVENTION

Figure 1:
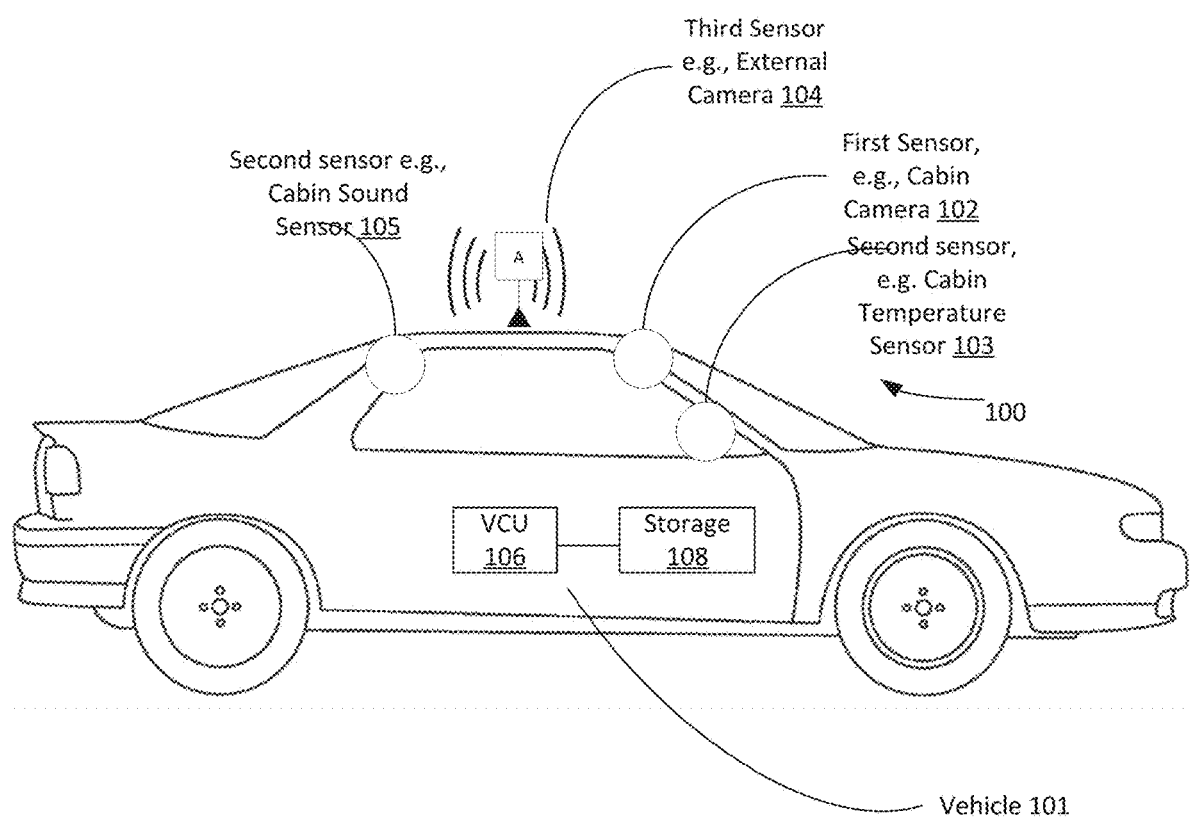
FIG. 1 generally illustrates a method and system for monitoring user activity in a vehicle in accordance with the disclosure.

In accordance with the disclosure, embodiments can provide a method and system for monitoring user activity in a vehicle. Various embodiments herein will be described below with reference to the accompanying drawings constituting a part of this specification. It should be understood that, although structural parts and components of various examples of the present disclosure are described by using terms expressing directions, e.g., "front", "back", "upper", "lower", "left", "right" and the like in the present disclosure, these terms are merely used for the purpose of convenient description and are determined on the basis of exemplary directions displayed in the accompanying drawings. Since the embodiments disclosed by the present disclosure may be set according to different directions, these terms expressing directions are merely used for describing rather than limiting. Under possible conditions, identical or similar reference numbers used in the present disclosure indicate identical components.

One insight provided by the present disclosure is to generate a takeover request for a user to regain control of an autonomous driving vehicle based on a current activity engaged by the user, various environment data, and/or any other considerations. Under traditional approaches, a takeover request is typically generated by the traditional systems without taking these considerations into account and does not get updated dynamically based on these considerations. As mentioned, the traditional approaches are not optimal because alertness of a user to regain control of the autonomous driving vehicle can be different in different situations depending on these considerations. However, the traditional auto-manual driving transition systems tend to default a takeover request based on a pre-set time frame, such as 10 seconds before the user needs to regain control. This is not optimal because the pre-set time frame may not be long enough if the current activity being performed by the user requires more time for the user to regain control. In some cases the pre-set time frame may be too long leading to the user's procrastinating on the takeover request, or the user may even begin a new task within the pre-set time frame if the user knows the control will not be given to the user until the pre-set time have expired.

For example, when the human is engaging an activity using his personal device, such as texting using a smart phone, a level of the human's responsiveness may be very different from that when he/she is listening to music and relaxing in the vehicle. Accordingly, reaction time for the human's regaining of the control of the autonomous driving vehicle should be different in those situations. As another example, a human's alertness is generally higher in day time than night time, and thus the reaction time should also be different in those situations. Different reaction time predictions can lead to very different takeover plans to have the human regain control of the vehicle. Longer reaction time could require more drastic instructions in the takeover plan than shorter reaction time. The ultimate goal is to transition the user to manual driving in an effective way.

In accordance with the present disclosure, a current activity of a human in autonomous driving vehicle can be captured and analysed to classify the current activity into a corresponding activity group. In some embodiments, driving environment external to the autonomous driving vehicle (external environment herein) and/or internal to the autonomous driving vehicle (internal environment herein) can also be analysed. Based on the activity group and the internal and/or external environment data, a takeover request for the user to regain the control of the vehicle can be generated. In some embodiments, mappings among reaction time, activity groups, external environment data, internal environment data can be established and updated dynamically based on actual reaction time in response to a takeover request generated.

Figure 2:
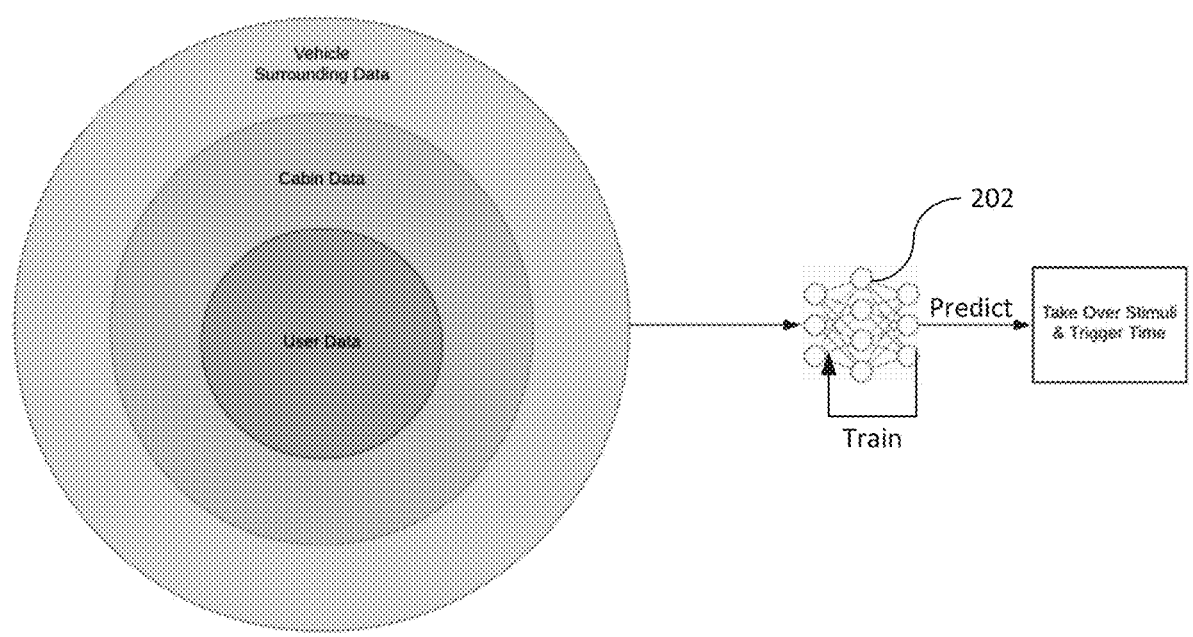
FIG. 2 generally illustrates a principle behind the present disclosure

FIG. 2 generally illustrates a principle behind the present disclosure. As shown, user data such as user current activity dada in real time, internal cabin environment data, external environment data such as vehicle surrounding data, and/or any other relevant data can be captured. These data can be fed to one or more classifiers 202, such as a neuro network, for generating a takeover request, which may include one or more takeover stimuli (e.g., such as audio, visual, or haptic), trigger time (i.e., predicted reaction time for the user to respond to the takeover stimuli) and/or any other controls. As also shown, these data can also be used to update/train the classifier(s) 202 to improve future takeover request generation. For the updating/training, the user data captured is the actual reaction time or an actual level of responsiveness by the user in response to a particular takeover request generated. Such user data, along with the cabin environment data and external environment data can be used to update/train the classifier(s) 202.

FIG. 1 generally illustrates an example system 100 for generating a takeover request for a user to regain a control of a vehicle 101 in accordance with the disclosure. As shown in this example, the system 100 can be included in the vehicle 101. The vehicle 101 may include any vehicle that moves in distance. Examples of vehicle 101 may include a vehicle such as a car, a bus, a truck, or any other type of vehicle. In one example, the vehicle 101 is an electrical automobile.

The system 100 can be configured to generate a takeover request for a user to regain a control of the vehicle 101 based on user activity within the vehicle 101. In general, the system 100 can classify user activities into different activity groups. Each activity group may be mapped a corresponding baseline reaction time, which can be used as the predicted reaction time. This predicted reaction time can indicate a user's responsiveness, while engaging the current activity, to a takeover request to regain a control of the vehicle 101. Based on this predicted reaction time and as well as internal and/or external environment data, the system 100 can generate a takeover request for effectively having the user regain the control of the vehicle 101. Such a takeover request may include which one or ones of stimuli to use, one or more manners for presenting the stimuli, one or more periods for triggering the selected stimuli, and/or any other controls.

In various embodiments, the system 100 can be configured to update the reaction time associated with different activity groups. In those embodiments, after a takeover request is generated, the system 100 can obtain user data indicating an actual reaction time for the user to regain the control of the vehicle 101. The actual reaction time can then be stored by system 100 for updating the baseline reaction time mapped to the activity groups.

In implementations, as shown, the system 100 may include various sensors such as one or more of a cabin camera 102, a cabin temperature sensor 103, an external camera 104, a cabin sound sensor 105, a vehicle control unit 106 (VCU) and/or any other components. The system 100 can generate or receive data from time to time. The data can include current activity data regarding the user, internal environment data regarding the vehicle such as cabin sound, cabin temperature, time of day, external environment data such as a road condition that the vehicle being traveled on and a regulation in a zone the vehicle is in, and/or any other data.

The system 100 may include one or more of a first sensor in the vehicle 101 to acquire current activity data regarding the user. The current activity data of the user may reflect a first current activity engaged by the user in the vehicle 101. In some embodiments, the first sensor may include a cabin camera 102 as shown in this example for obtaining current activity data regarding the user. As described herein, the current activity data may include any activity conducted by a user of the vehicle 101 at a given point of time. For example, when the vehicle 101 is in autonomous driving mode, the user can engage in a number of different activities, such as, but certainly without limitation, applying the accelerator or brakes, turning the steering wheel, checking blind spots, adjusting the radio, receiving a cellular telephone call, checking navigation information, carrying on a conversation with another user in the vehicle 101, quieting kids in a rear seat of the vehicle 101, and etc.

In some embodiments, the cabin camera 102 may be configured for obtaining activity data such as data indicating head, body, hand, eye and feet movements of the user at the given point of time, head and eye dynamics of the user at the given point of time, data indicating the operative states and user usage of infotainment, telematics systems and other connected devices at the given point of time. In some embodiments, the user activity data may also be provided by various other cabin sensors. For example, seat sensors and/or infrared sensors may be configured and employed to obtain information indicating a number and locations of passengers in the vehicle. Floor and steering wheel sensors may be configured and employed to obtain data indicating a position of the user's feet and hands at the given point of time.

By way of illustration, the cabin camera 102 can be configured to point to a certain area of the vehicle (e.g., driver's seat). The cabin camera can be configured to capture an image of that area from time to time (e.g., every 10 seconds or so). Each image or frame taken by the cabin camera 102 can be transmitted to the VCU 106 for processing. As will be described, such processing may include analysing the frames and determining a current activity engaged by the user. It should be understood, the current activity of interest does not necessarily mean the current activity specific to a current time point as colloquially used. Rather, it is contemplated that current activity means the activity is current to a given point of time. For example, the cabin camera 102 may be configured to capture 60 frames within a 10 minute span. The VCU 106 may be configured to determine 5 current activities (one for every two minutes) within that time span. That is, each of the 5 current activities may be current to a corresponding two minute window. As described, these current activities can be analysed for predicting a reaction time and/or updating the reaction time for the user to regain the control of the vehicle 101 from the autonomous driving mode.

In some embodiments, there may be more than one cabin camera 102 installed within the vehicle 101. For example, one or more cabin cameras 102 may be installed at a front of the vehicle 101 (e.g., wind-shield of the vehicle 101), one or more cabin cameras 102 may be installed at a rear of the vehicle 101 (e.g., at the left or right rear beam pillars in the vehicle 101), one or more cabin cameras 102 may be installed at a side of the vehicle 101, and/or any other locations of the vehicle 101.

In some embodiments, the system 100 may include storage coupled to the VCU 106, such as the storage 108 shown in FIG. 1. The storage 108 can be configured for storing various types of data, which may include data captured by various sensors shown in FIG. 1, reaction time associated with different activity groups, user information data for facilitating prediction of reaction time, and/or any other data. In some embodiments, the storage 108 can store information regarding past performance of the user. For example, the storage 108 can be configured to store a certain number of frames captured by cabin camera 102. The storage 108 can be configured to store associations between activity groups and their corresponding baseline reaction time. An example of such associations is illustrated below:

TABLE 1

| Activity Group 1 | Takeover Stimuli #1 (e.g., visual) | 5 seconds |
| Activity Group 1 | Takeover Stimuli #2 (e.g., audio) | 7 seconds |
| ... | | ... |
| Activity Group N | Takeover Stimuli #1 (e.g., visual) | X seconds |

In the above table 1, a given row indicates when a user engages an activity in a particular activity group (e.g., group 1), it will take corresponding time duration (e.g., 5 seconds) for the user to regain control of the vehicle after a takeover request using a corresponding takeover stimuli (e.g., stimuli #1) is presented to the user. As will be described, these associations can be updated as the system 100 start learning data points indicating actual reaction time for the user under various conditions while engaging the activities corresponding to different activity groups. In some embodiments, system 100 may be configured with such associations as shown in table 1 at an initial stage (e.g., before it is used by the user of the vehicle 101 for the first time). These associations may reflect a predetermined or default baseline reaction time for different activity groups.

Below is an illustration of how system 100 may be configured to initialize and/or update the associations shown in table 1. For example, in a scenario when the user is needed to regain control soon, the system 100 may initiate a takeover request and alert the user with an accompanying baseline stimulus signal (e.g., visual). When a takeover request signal is sent, an initial time reference, time t, will be set, and the system 100 will then determine whether the user has regained the control as requested. Once the system 100 concludes the user regained control of the vehicle 101, the system 100 will stop the timer and calculate the difference, Δt, from initial takeover request signal to when the user was under total control. After the system 100 has a recorded reaction time as a reference, the system 100 can classify the previous configurable X number of captured frames of the user before the takeover request to a corresponding activity group when given that specific takeover request stimulus.

As still shown, the system 100 may include one or more of a second sensor in the vehicle 101 to acquire internal environment data regarding the vehicle 101 during the first current activity. The second sensor can be configured for monitoring the user and as well as the internal environment of the vehicle 101. For example, although not shown, seat sensors and microphones can be installed in the vehicle 101 to collect relevant data regarding the user and the cabin of the vehicle 101. Such data can allow the system 100 to determine the location and position of the user, the sound level, and the presence of passengers and other potential sources of distractions.

One example of the second sensor is a cabin sound sensor 105 shown in FIG. 1. The cabin sound sensor 105 can be configured to collect sounds within the vehicle 101. For collecting the sounds of the drivers and passengers, a few factors need to be taken into account. First, the sound sensor 105 may not be very "sensitive" in picking up sound signals except for those produced by the persons or by sound players in the vehicle. In this way, environment sounds may not be collected or may be reduced, such as environment noise when the vehicle in driving status. Second, the sound sensor 105 may be connected to a power source such as batteries in order for it to be powered and running. In any case, the sound sensor 105 may be coupled to a wire that is capable for transmitting analog signals, or coupled to a wireless data transmission component for transmitting analog signals. Another example of the second sensor is the cabin temperature sensor 103 shown in FIG. 1 configured for capturing a temperature with the cabin of vehicle 101 at a given point of time.

In some embodiments, the system 100 may include one or more of a third sensor for obtain external environment data. External environment data may encompass data related to the environment in which the vehicle is operating, e.g., the road conditions, traffic conditions, weather, etc. The vehicle environment data may be provided by sensors that also provide vehicle-operating data. The vehicle operating data encompasses data produced by the various vehicle sensors. Vehicle condition monitoring sensors are pervasive in an automobile. These sensors monitor numerous parameters such as engine operating parameters, vehicle speed, transmission and wheel speed, vehicle acceleration in three axes, chassis function, emission control function, etc. These sensors may also provide data related to vehicle diagnostics. For example, road surface and traction estimates may be provided by anti-lock braking, traction control and chassis control system sensors. Vehicle location may be provided by an on-board navigation system utilizing global positioning system (GPS) technology, or location information may be provided by a wireless communication device (e.g., a cellular telephone) and associated wireless communication network. Radar, laser, ultra-sonic and video systems can provide a map of objects near the vehicle and their motion relative to the vehicle. Weather and time of day may also be monitored directly or derived from reported sources.

As described herein, the external environment data may include weather conditions, road conditions, traffic conditions, local conditions, and/or any other external conditions. The external environment data may be received by vehicle 101 wirelessly, for example via satellite, radio, GPS, and/or any other wireless communication means. For example, as illustrations, the vehicle 101 may receive weather condition information via a satellite service, a radio service, and/or any other means. For instance, weather conditions may be broadcast in certain areas via radio frequencies and may be received by the vehicle 101. As another example, traffic conditions in the areas where the vehicle 101 is traveling in may be received by the vehicle 101 via a GPS service. Still as another example, road conditions indicating curvatures, bumps, slope, number of lanes and/or any other road conditions may be received via a map service or a GPS service. The local conditions may include conditions regarding local events (e.g., a local event with more than 500 attendees is being held) or local attractions (e.g., a beach is located 2 miles ahead) in the areas where the vehicle is traveling in. Such local conditions may be received by the vehicle 101 via radio, a subscribed local information service, a map service, a GPS service, and/or any other type of channels.

One example of the third sensor is an external camera 104 as shown in FIG. 1. The external camera 104 can be configured for collecting road conditions and traffic conditions. In some embodiments, the system 100 may include other types of the third sensor, such as radar, lidar, laser, video and infra-red sensors around the perimeter of the vehicle to monitor traffic and weather conditions, obstacles, lane markings, etc.

In addition to obtaining data from a variety of sources for reaction time prediction, the system 100 interfaces with the vehicle operator/user. As will be appreciated, numerous sources of data exist within and about the vehicle environment, which may be utilized by the system 100. Several data types have been described above, others will be described in connection with the operation of the system 100, and still others not specifically referred to herein may be used without departing from the scope and spirit of the invention. It will be appreciated that as new technologies introduce new types and sources of data and new types and sources of information into the vehicle, the system 100 may be adapted to utilize these additional sources of data to manage how the existing and new sources of information are processed according to the method of this application.

Figure 3:
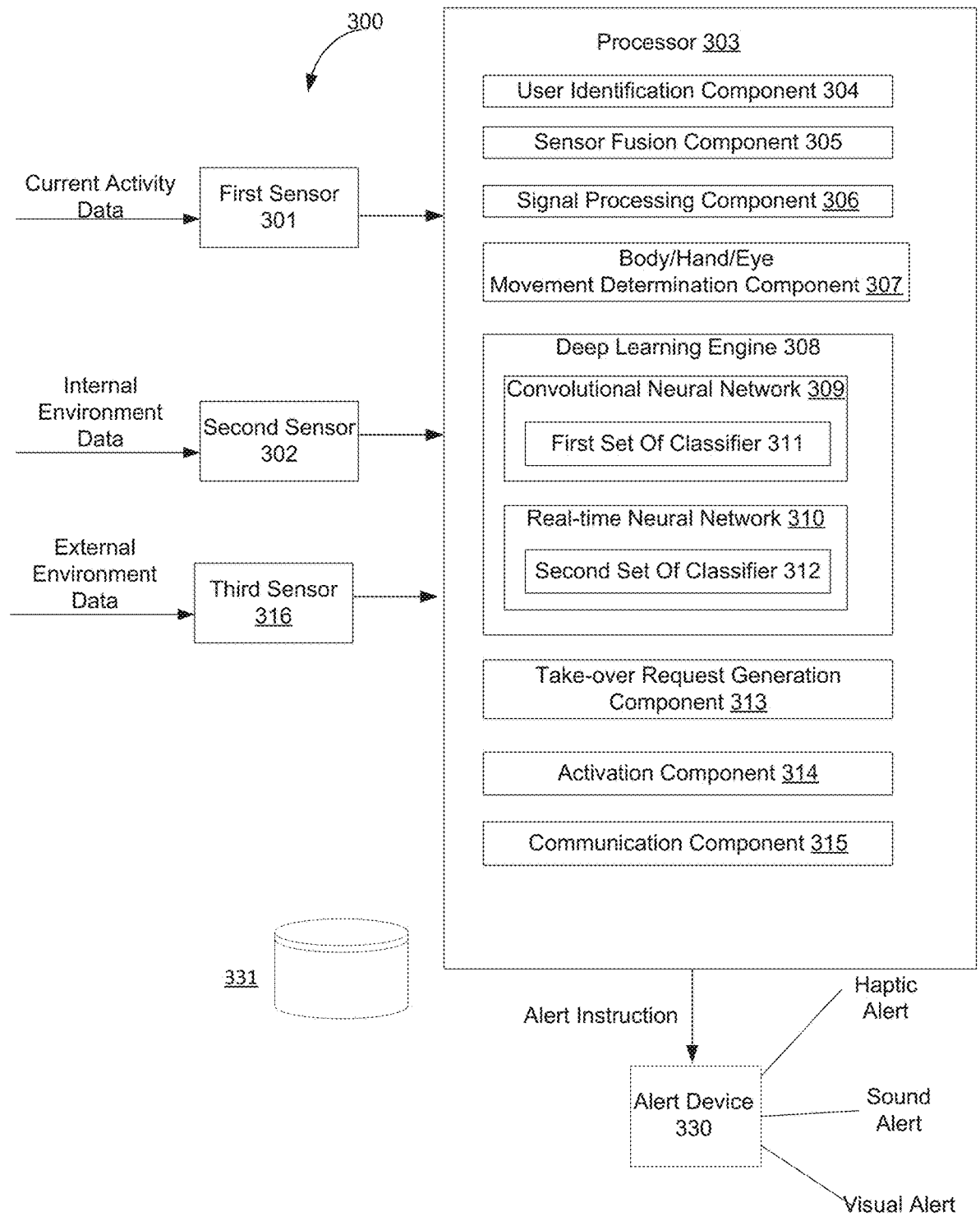
FIG. 3 illustrates an exemplary structure of the system shown in FIG. 1 in accordance with the disclosure.

With the a system for monitoring user activity in a vehicle having been generally described, attention is now directed to FIG. 3. FIG. 3 illustrates an exemplary structure of the system 100 shown in FIG. 1. As shown, the system 100 may include one or more of a processor 303 configured to implement computer program components, a storage device 331, an alert device 330 and/or any other components. The computer program components can include a user identification component 304, a sensor fusion component 305, a signal processing component 306, a body/hand/eye movement determination component 307, a deep learning engine 308, a convolutional neural network (CNN) 309, a real-time neural network 310, a first set of classifier 311, a second set of classifier 312, a take-over request generation component 313, an activation component 314, a communication component 315 and/or any other components. All these components are illustrated in FIG. 3 as separate elements for purposes of clarity and discussion. It will be appreciated these components may be integrated into a single module. Moreover, it will be appreciated that each of these components, or an integrated module, may include a suitable processing device, such as a microprocessor, digital signal processor, etc., one or more memory devices including suitably configured data structures, and interfaces to couple the system 100 to various vehicle sensors and to interface with a user.

In some embodiments, the system 100 may be arranged within the vehicle 101. In those embodiments, the system 100 may be configured to communicate with various sensors and devices for the user activity data and environment data described herein through short range communication methods, such as Bluetooth, WiFi and/or any short range communication methods. In some embodiments, the system 100 may be arranged within a control centre, for example as a remote server provided by the control centre. In those embodiments, the system 100 may be configured to communicate with the various sensors and devices through a communications network.

The user identification component 304 can be configured to identify the operator of the vehicle 101. The identification of the operator by the user identification component 304 can be made based on the fingerprint image acquired by a fingerprint detection component provided in the vehicle 101, the image of operator's face captured by an image capturing device arranged within the vehicle 101, and/or any other identification information regarding operator. For example, the identification by the user identification component 304 may involve analysing features in the fingerprint image and/or in the facial image of the operator, and compared the obtained features with features of registered operators. Upon a match, the user identification component 304 can be configured to obtain a user ID of the identified operator and acquire stored user data from the storage device 331.

The sensor fusion component 305 can be configured to receive data from numerous sources within and surrounding the vehicle. As illustrated in FIG. 3, the sensor fusion component 305 can receive environment data from the second sensor 302 and/or the third sensor 316, and user activity data from the first sensor 301. In some implementations, user's actions can be fed to the sensor fusion component 305 via the sensors through communications links between those sensors and the processor 303.

The signal processing component 306 can be configured to process the signals received from the first sensor 301, second sensor 302, third sensor 316 and/or any other sources. In any case, after receiving the signals received from these sensors, the signal processing component 306 may be configured to convert analog signals to digital signals.

The body/hand/eye movement determination component 307 can be configured to determine an body movement and/or a hand movement and/or an eye movement of the user based on a body, hand or facial image captured by the first sensor 301 (such as the cabin camera 102) or other movement capturing device. The determination by the body/hand/eye movement determination component 307 may involve determining a position of the body, and/or a hand or hands, and/or an eyeball or eyeballs of the user in the received image. Position changes to the body/hand/eyeball(s) between two images captured in sequence can be determined based on the position of the body/hand/eye(s) in each image. An body/hand/eye movement of the user can be estimated based on the determined position changes. The body/hand/eye movement determination component 307 can be configured to determine whether the user is asleep or drowsy based on the determined body/hand/eye movement. For example, if the position of the eyeball(s) of the operator cannot be detected for a time period, the user can be determined to be asleep because it is likely the user has closed his/her eyes.

The deep learning engine 308 can be configured to maintain, manage, store, update, tune, or configure the one or more neural networks 309 and 310. The deep learning engine 308 can use different parameters, weights, training sets, or configurations for each of the neural networks to allow the neural networks to efficiently and accurately process a type of input and generate a type of output. By separately configuring and tuning each of the neural networks, the system 100 can improve the efficiency, reliability and accuracy relative to using a same neural network or not using a neural network, since each of the different neural networks can be trained and tuned to process a specific input and generate a specific output to facilitate the data flow.

For example, the first neural network 309 can be configured as or include a convolution neural network. The first neural network 309 can be trained to generate, using a first set of classifier 311, key point data regarding the user, while the key point data indicating a first set of body and/or hand and/or eye movement points of the user during the first current activity. The convolution neural network can include one or more convolution cells (or pooling layers) and kernels, that can each serve a different purpose. The convolution kernel can process input data, and the pooling layers can simplify the data, using, for example, non-linear functions such as a max, thereby reducing unnecessary features. The first neural network 309 including the convolution neural network can facilitate image recognition to generate key point data about the user's activity. For example, the sensed input data can be passed to convolution layers that form a funnel, compressing detected features. The first layer can detect first characteristics, the second layer can detect second characteristics, and so on.

The convolution neural network can be a type of deep, feed-forward artificial neural network configured to analyze visual imagery. The convolution neural network can include multilayer perceptron designed to use minimal pre-processing. The convolution neural network can include or be referred to as shift invariant or space invariant artificial neural networks, based on their shared-weights architecture and translation invariance characteristics. Since convolution neural networks can use relatively less pre-processing compared to other image classification algorithms, the convolution neural network can automatically learn the filters that may be hand-engineered for other image classification algorithms, thereby improving the efficiency associated with configuring, establishing or setting up the neural network, thereby providing a technical advantage relative to other image classification techniques.

The first neural network 309 can include a convolution neural network designed and constructed to have an input layer and an output layer. The first neural network 309 can also have one or more hidden layers that can include convolution layers, pooling layers, fully connected layers, or normalization layers. For example, in a convolution layers, the system 100 can apply a convolution operation to the input, passing the result to the next layer. The convolution emulates the response of an individual neuron to visual stimuli. Each convolutional neuron processes data only for its receptive field. Using the convolution operation can reduce the number of neurons used in the neural network as compared to a fully connected feedforward neural network. Thus, the convolution operation brings a technical solution to this problem as it reduces the number of free parameters, allowing the network to be deeper with fewer parameters. For example, regardless of image size, tiling regions of size 5×5, each with the same shared weights, may use only 35 learnable parameters. In this way, the first neural network 309 with a convolution neural network can resolve the vanishing or exploding gradients problem in training traditional multi-layer neural networks with many layers by using backpropagation.

The system 100 can train the first neural network 309 using historical user data stored in the storage device 331. In some instances, the first neural network 309 can be trained on one or more servers remote from the system 100. For example, the first neural network 309 can be trained on one or more servers remote from the vehicle 101, and then loaded or transmitted to the vehicle 101. In some instances, the first neural network 309 can be trained by the system 100 executing on the vehicle 101.

The system 100 may include a second neural network 310 to assign, using a second set of classifier 312, based on the key point data generated by the first neural network 309 and the environment data, the first current activity to the first activity group. The second neural network 310 can be maintained by the deep learning engine 308. The second neural network 310 can include one or more component or functionality of the first neural network 309. The second neural network 310 can be a same type of neural network as the first neural network 309. The second neural network 310 can differ from the first neural network 309 in that the second neural network 310 can be tuned, or trained on different data sets, configured to receive different inputs, and configured to generate a different output. The second neural network 310 can be trained to use historical user data stored in the storage device 331 and assign different user activity to different activity groups.

The take-over request generation component 313 can be configured to generate a take-over request for the user to regain the control of the vehicle based on the first mapping and first current activity being assigned to the first activity group. The take-over request generated by the take-over request generation component 313 can be transmitted to an alert device 330, and to generate an alert for presentation to the user to facilitate the user to regain the control of the vehicle within the response time duration.

The activation component 314 can be configured to deactivate or activate an component of the vehicle. For example, when the user doesn't regain control of the vehicle within a preset response time duration after notified by the first alert, the activation component 314 can generate a deactivation instruction to deactivate the sound player in the vehicle so that the user can notice the second alert. After the user regains control of the vehicle, the activation component 314 can generate an activation instruction to activate the sound player in the vehicle.

The communication component 315 can be configured to communicate the signals received by the signal processing component 306, the identification information regarding the user as identified by the user identification component 304, the take-over request made by the take-over request generation component 313, the activation or deactivation instruction made by the activation component 314, the alert instruction, and/or any other information to a control centre, and/or any other entities. The communication component 315 can be configured to communicating such information via a communications network.

The alert device 330 can be configured to generate an alert for presentation to the user to facilitate the user to regain the control of the vehicle within the response time duration. The alert can be haptic alert, sound alert, visual alert, or combination of them. In some embodiments, the alert can be implemented to vibrate the driver seat, to make a sound alert in the cabin, and/or to display a visual alert on the dash board or the wind shield glass. In some embodiments, the alert device 330 can generate a first alert to the user. When the user doesn't regain control of the vehicle within a preset response time duration, the system 100 can escalate and cause the alert device 330 to generate a second alert, which is higher in scale than the first alert.

The storage device 331 may be configured to store user data described herein. In implementations, the storage device 331 may include a memory storage device, a disk storage device, a cloud storage device, and/or any other type of storage device.

It should be understood the above-described functionalities attributed to system 100 can be implemented within the vehicle 101. However, this is not necessarily the only case. In certain embodiment, part of or the entire functionalities attributed to system 100 herein can be implemented at the control centre. For example, the control centre may comprise a server that can be configured to perform part of the operations provided by system 100 as described above.

Figure 4:
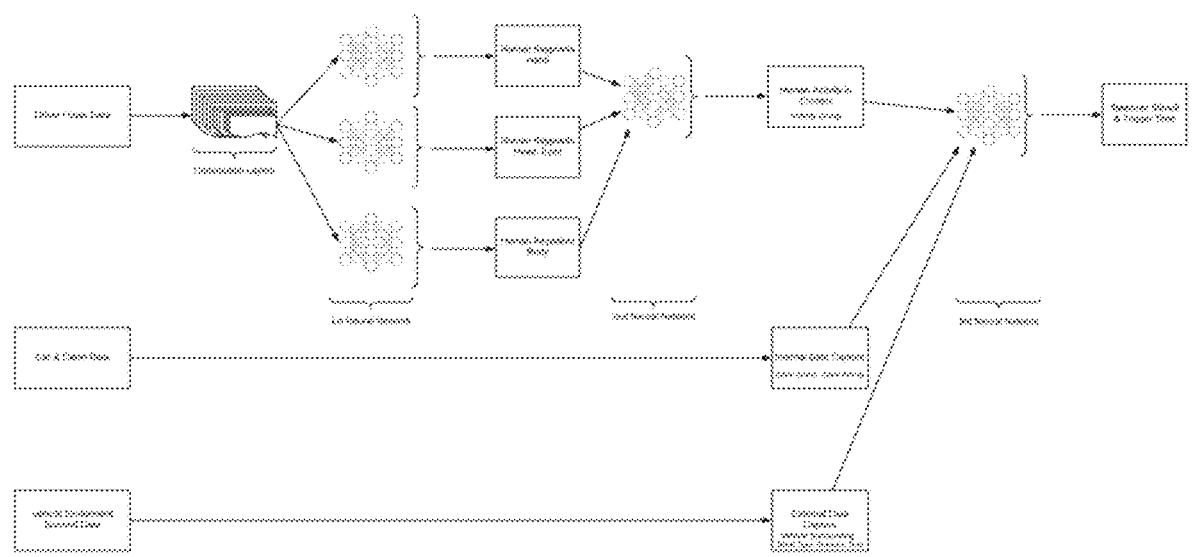
FIG. 4 illustrates a flow diagram showing generally how a takeover plan in real-time is generated based on user activity data and various environment data in accordance with the disclosure.
Figure 5:
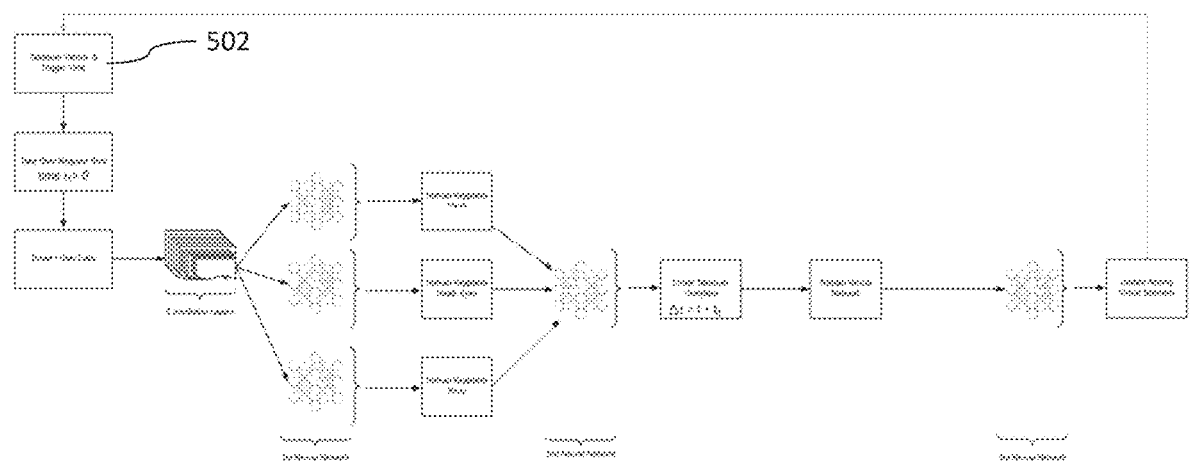
FIG. 5 illustrates a flow diagram showing generally how the classifiers shown in FIG. 4 may be trained based on actual reaction time by the user.

With an example implementation of system 100 having been described and illustrated, attention is now directed to FIG. 4 and FIG. 5, where real-time reaction time prediction and classifier training for the prediction in accordance with the disclosure is illustrated. FIG. 4 illustrates a flow diagram showing generally how a takeover plan in real-time is generated based on user activity data and various environment data in accordance with the disclosure. As shown, user activity data can be captured and fed to a first group of classifiers, such as the first neuro network shown in FIG. 4. As illustration, the captured user data may be certain number of frames of image data of the user in real-time (e.g., user activity in the last 10 seconds). As described and illustrated herein, such user data can be captured by a first sensor such as the cabin camera 102 shown in FIG. 1.

As shown, the captured real-time user data can be fed to the first neuro network. An example of the first neuro network is provided in FIG. 3—i.e., the first set of classifiers 311. As shown, at this level, the first neuro network is used for determining a first set of one or more human key points corresponding to a hand of the user, a second set of one or more human key points corresponding to a head and eyes of the user, a third set of one or more human key points corresponding to a body of the user, and/or any other data. These determinations/classifications based on the user data may depend on one or more features regarding the user detected in the user data. Some amount of image/video processing may be performed in some embodiments for such determination/classification. For example, the user data may be processed to detect a posture of the user and the detected posture of the user (data points indicating such a posture) can be fed to the first neuro network, which can in turn to classify the detected user posture into the above-described key points.

It should be understood that the key points determined/classified by the first neuro network do not necessarily have to have a meaning in terms of what the current posture of the user is (e.g., head slightly down, eye gazing at a certain angle). In fact, such posture information is not of a concern to this disclosure. A goal at this stage is to simply be able to distinguish one user posture from another for reaction time prediction purpose. An advantage of system 100 is that it does not attempt to recognize the current user activity qualitatively, for example, eye gaze, blink frequency, head pose, but rather to detect the interruptibility and time needed by a user to regain complete control of the driving task based on different stimulus trigger signals at any given time. Previous systems require the driver to monitor the vehicle for the system to continue operating the vehicle on its own. In contrast, because not tracking any specific user activities, system 100 gives the user the freedom and the choice to either monitor vehicle 101 or not so that the user can have the luxury of doing what he/she wants inside vehicle 101 and know that the vehicle 101 will stay on course and under control no matter what he/she chooses to do.

As also shown in FIG. 4, the human key points determined/classified by the first neuro network can be fed to a second neuro network to determine an activity group corresponding to the human key points determined from the user data. As described herein, multiple activity groups may be established for the reaction time prediction and each activity group may be associated with one or more baseline reaction time depending on the environment data. Similarly, an individual activity group does not necessarily have to have a meaning in terms of what the user current activity is for this activity group. The activity groups may be established to distinguish user activities that may lead to different reaction time by the user to regain the control of the vehicle. In FIG. 4, as shown, a particular activity group may be determined/classified as being corresponding to the set of human key points determined from the user data. Classification/determination at this stage can involve detecting certain features from the set of human key points and classifying these features into the particular activity group using the second neuro network.

After the particular activity group is determined for the user current activity as captured by the user data, a baseline reaction time associated with the particular activity group can be obtained. In one embodiment, the baseline reaction time can be obtained from the table 1 described above. After the baseline reaction time is obtained, the next step is to determine an appropriate takeover request. As described herein, various types of data such as the internal cabin environment data and external environment data can be used to generate the takeover request in association with the determined reaction time for the particular activity group. For example, user looking down at an entertainment console of the vehicle versus user looking down at his/her smart phone may require different takeover requests—e.g., one may involving simply shutting off the entertainment console while the other may involve generating loud audible alert to the user—even though the classification of the current activity of both situations may point to the same activity group. Accordingly, as shown in FIG. 4, the internal cabin environment data and the external environment data, along with the determined activity group information are fed to yet another neuro network—i.e., the third neuro network for further classification to generate the takeover request. As shown, the classification by the third neuro network takes in determined activity group information, the internal cabin environment data, and the external environment data as the input and generate an output of the takeover request including reaction time (trigger) and/or selected one or more takeover stimuli mapping to those data.

By way of example, below is illustration of the system to generate a takeover request for a user to regain a control of the vehicle. In this example, the user is doing an activity other than driving, for example, reading a book. The user is given a takeover request from system 100 to regain the responsibility of driving through a visual takeover stimulus. The user takes less than 5 seconds to return to the wheel, this means his/her reaction time for the activity being performed before the takeover request was sent is less than 5 seconds. Therefore, the system 100 may be configured to classify the video frames prior to the takeover request as an activity which has a reaction time of less than 5 seconds when given a visual takeover stimulus. This detected activity may fall within the reaction times range of group 3 activity, thereby making the activity in the video frames a group 3 activity. System 100 can be configured to use a real time neural network classifier that is trained on the previously collected data (such as the first and second neuro networks) and will analyse video frames as they are received and recognize/classify known previous key points and place them in the correct activity group—i.e. group 3.

By way of example, below is another illustration of the system 100 to predict reaction time for a user to regain a control of the vehicle. In this example, the system 100 has been active and analysing video frames as they are received from the cabin camera 102 when the driver is not currently driving. Before the next video frame is received for analysis, the system 100 needs the driver to regain control of the vehicle soon. The system 100's real time classifiers—e.g., the first neuro network and the second neuro network recognize the driver's current activity as a group 3 activity and knows from previous data that the group 3 activity indicates the current activity will take less than 5 seconds for the driver to regain control. Now the system 100 uses another classifier—e.g., the third neuro network to analyse the noise level inside the cabin, time of day, and street type, and past reaction times with different takeover stimulus signals to determine that the user reacts most effectively in this scenario with a haptic takeover stimulus. This will assist the car in sending the takeover request at the precise time and in the correct form that will allow the user to have enough time to regain control of the vehicle and to make a calculated vehicle maneuverer. In this way, system 100 can predict how long it will take the user to regain control of the vehicle with good accuracy.

FIG. 5 illustrates a flow diagram showing generally how the classifiers shown in FIG. 4 may be trained based on actual reaction time by the user. As shown, after a takeover request 502 is generated and presented to the user at time t1, user activity data can be captured, for example through the cabin camera 102. Similarly to that shown in FIG. 4, the captured user data can be fed to the first neuro network to obtain a set of human key points as shown corresponding to one or more activities engaged by the user after time t1. These human key points can then be fed to the second neuro network for determining when the user's hands returned to the steering wheel and when the user was ready to make a calculated vehicle maneuverer. As shown, once it is determined based on the output of the second neuro network that the user has regained the control, a time difference value delta t can be determined to measure a time duration between the time t1 and the time when the user actually regains the control. As shown, the delta t can then be fed to the third neuro network, along with the user activity group determined before the takeover request 502 was sent and other environment data used to generate the takeover request 502, to retrain the third neuro network for improving future takeover request generation. In some embodiments, the delta t may also be used as a reference data point associated with the determined activity group. In those embodiments, individual activity group may have a number of such reference data points, which can be used to determine an average or mean reaction time for the user while the user engages an activity in the activity group. This average or mean reaction time can be used as baseline reaction time for that activity group.

Figure 6:
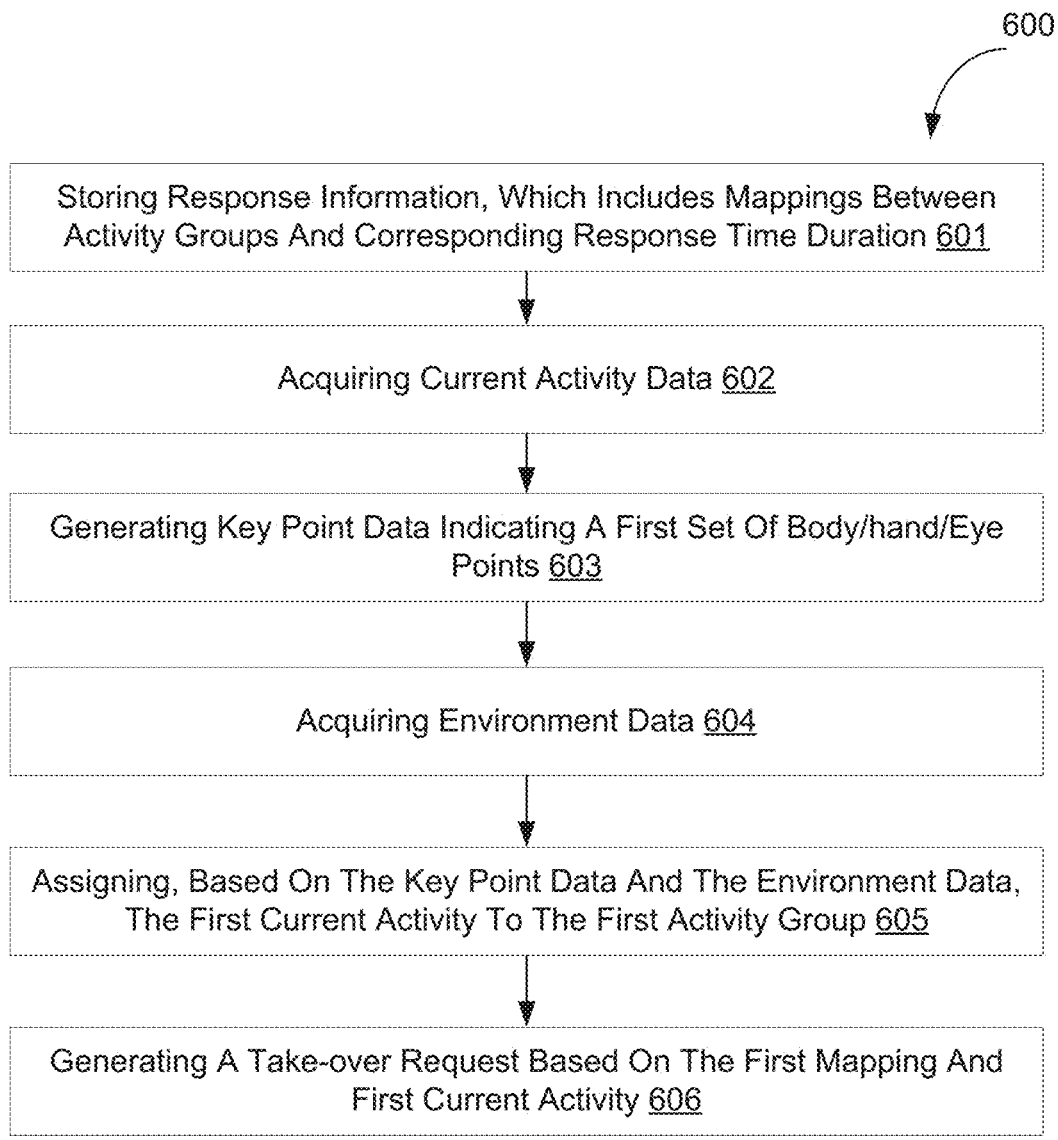
FIG. 6 illustrates one exemplary method for monitoring user activity in a vehicle in accordance with the disclosure.

FIG. 6 illustrates one exemplary method for monitoring user activity in a vehicle in accordance with the disclosure.

The operations of method 600 presented below are intended to be illustrative. In some embodiments, method 600 may be accomplished with one or more additional operations not described and/or without one or more of the operations discussed. Additionally, the order in which the operations of method 600 are illustrated in FIG. 6 and described below is not intended to be limiting.

In some embodiments, method 600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 600 in response to instructions stored electronically on an electronic storage medium. The one or more processing devices may include one or more devices configured through hardware, firmware, and/or software to be specifically designed for execution of one or more of the operations of method 600.

At 601, the method 600 includes storing response information regarding a user of the vehicle. The response information includes mappings between activity groups and corresponding response time duration for the user to regain a control of the vehicle, wherein the mappings include a first mapping between a first activity group and a first response time duration. In some implementations, operation 601 can be performed by a storage device substantially similar to or the same as the storage device 331 as described and illustrated herein.

At 602, the method 600 includes acquiring current activity data regarding the user, while the current activity data of the user indicating a first current activity engaged by the user in the vehicle. In some implementations, operation 602 can be performed by a cabin camera substantially similar to or the same as the cabin camera 102 as described and illustrated herein.

At 603, the method 600 includes generating key point data regarding the user, while the key point data indicating a first set of body and/or hand and/or eye movement points of the user during the first current activity. In some implementations, operation 606 can be performed by a first set of classifier substantially similar to or the same as the first set of classifier 311 as described and illustrated herein.

At 604, the method 600 includes acquiring environment data regarding the vehicle during the first current activity, while the environment data includes information regarding an environment surrounding the user during first current activity. In some implementations, operation 604 can be performed by a cabin temperature sensor, an external camera, and/or a cabin sound sensor substantially similar to or the same as the cabin temperature sensor 103, the external camera 104, and the cabin sound sensor 105 as described and illustrated herein.

At 605, the method 600 includes assigning, based on the key point data the first current activity to the first activity group. In some implementations, operation 605 can be performed by a second set of classifier substantially similar to or the same as the second set of classifier 312 as described and illustrated herein.

At 606, the method 600 includes generating, based on the environment data and the determined activity group, a take-over request for the user to regain the control of the vehicle. In some implementations, operation 606 can be performed by a take-over request generation component substantially similar to or the same as the take-over request generation component 313 as described and illustrated herein.

Figure 7:
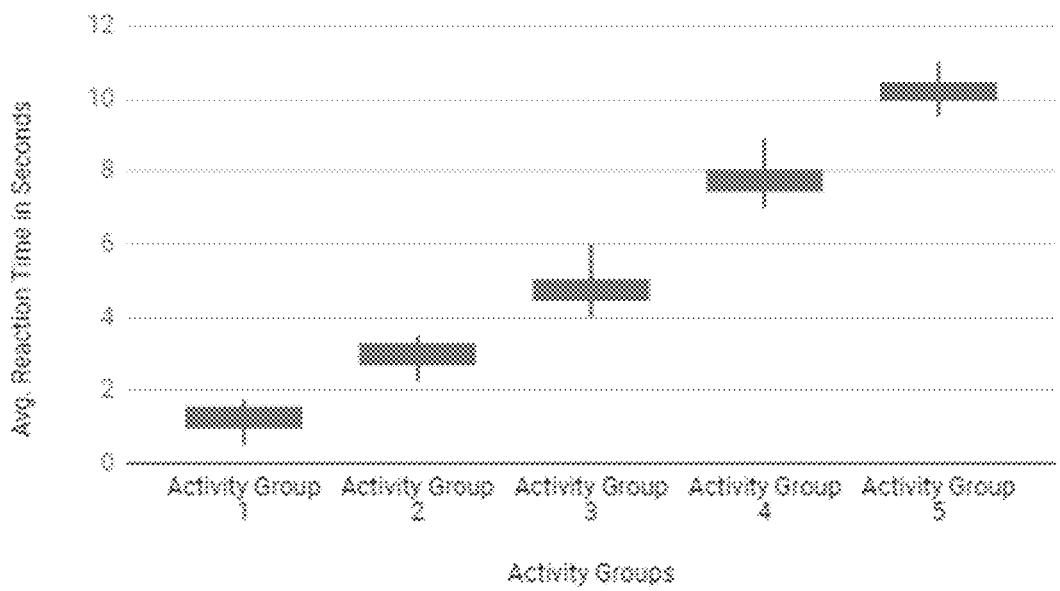
FIG. 7 illustrates the reaction time for the different activity groups according to an exemplary embodiment of the present disclosure.
Figure 7:
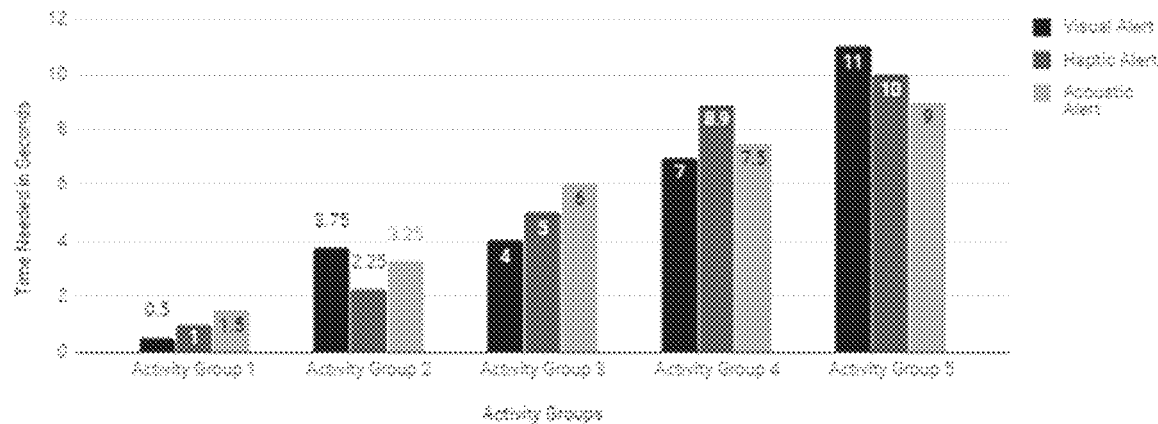

FIG. 7 illustrates the reaction time for the different activity groups according to an exemplary embodiment of the present disclosure.

Figure 8:
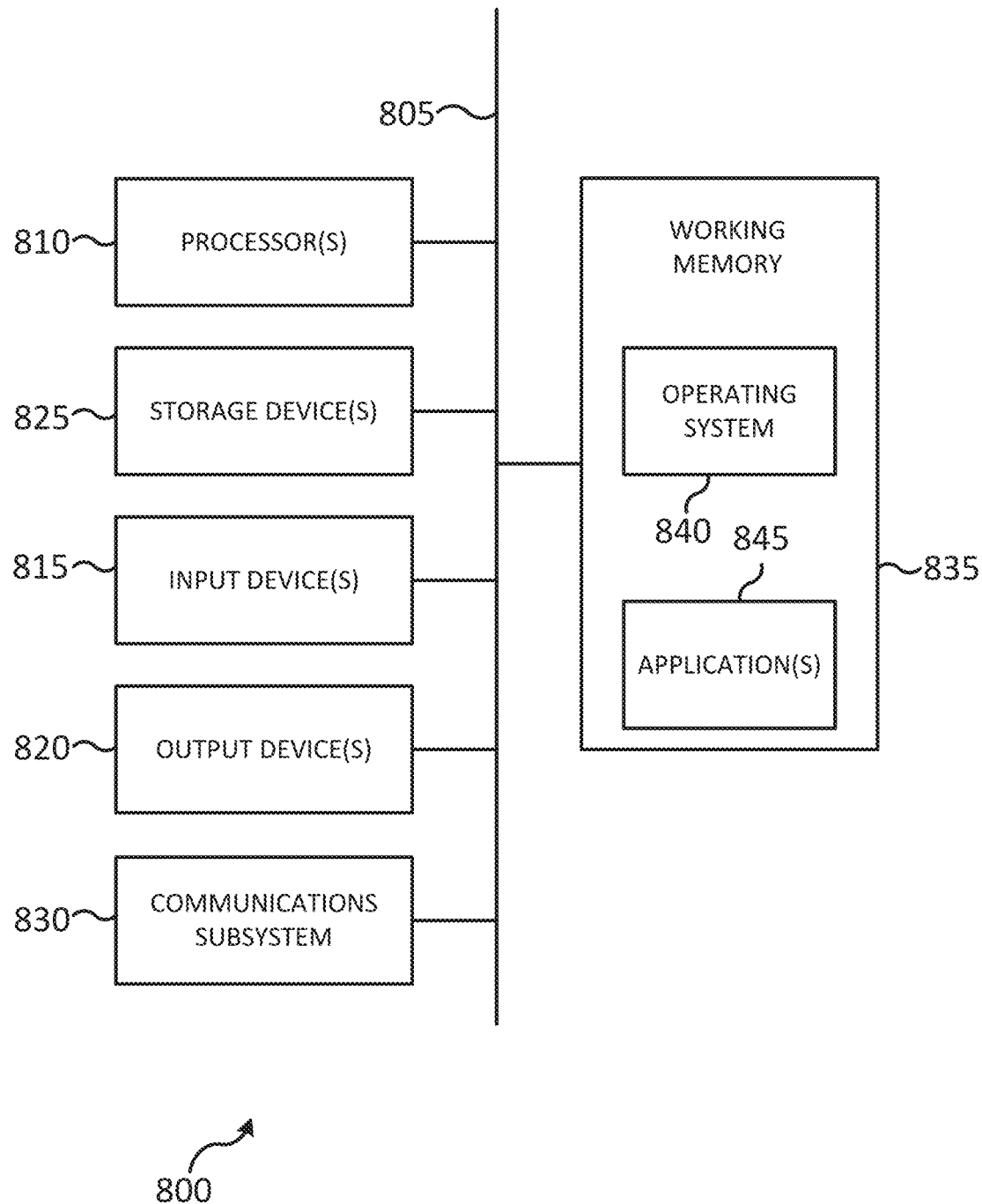
FIG. 8 illustrates a simplified computer system, according to an exemplary embodiment of the present disclosure.

FIG. 8 illustrates a simplified computer system, according to an exemplary embodiment of the present disclosure. A computer system 800 as illustrated in FIG. 8 may be incorporated into devices such as a portable electronic device, mobile phone, or other device as described herein. FIG. 8 provides a schematic illustration of one embodiment of a computer system 800 that can perform some or all of the steps of the methods provided by various embodiments. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner.

The computer system 800 is shown comprising hardware elements that can be electrically coupled via a bus 805, or may otherwise be in communication, as appropriate. The hardware elements may include one or more processors 810, including, without limitation, one or more general-purpose processors and/or one or more special-purpose processors such as digital signal processing chips, graphics acceleration processors, and/or the like; one or more input devices 815, which can include, without limitation, a mouse, a keyboard, a camera, and/or the like; and one or more output devices 820, which can include, without limitation, a display device, a printer, and/or the like.

The computer system 800 may further include and/or be in communication with one or more non-transitory storage devices 825, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 800 might also include a communications subsystem 830, which can include without limitation a modem, a network card (wireless or wired), an infrared communication device, a wireless communication device, and/or a chipset such as a Bluetooth™ device, an 1002.11 device, a WiFi device, a WiMax device, cellular communication facilities, etc., and/or the like. The communications subsystem 830 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 830. In other embodiments, a portable electronic device, e.g. the first electronic device, may be incorporated into the computer system 800, e.g., an electronic device as an input device 815. In some embodiments, the computer system 800 will further comprise a working memory 835, which can include a RAM or ROM device, as described above.

The computer system 800 also can include software elements, shown as being currently located within the working memory 835, including an operating system 840, device drivers, executable libraries, and/or other code, such as one or more application programs 845, which may comprise computer programs provided by various embodiments, and/or configure systems, provided by other embodiments, as described herein. Merely by way of example, one or more procedures described with respect to the system discussed above, such as those described in relation to FIG. 8, might be implemented as code and/or instructions executable by a computer and/or a processor within a computer; in an aspect, then, such code and/or instructions can be used to configure and/or adapt a general purpose computer or other device to perform one or more operations in accordance with the described system.

A set of these instructions and/or code may be stored on a non-transitory computer-readable storage medium, such as the storage device(s) 825 described above. In some cases, the storage medium might be incorporated within a computer system, such as computer system 800. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by the computer system 800 and/or might take the form of source and/or installable code, which, upon compilation and/or installation on the computer system 800 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 800 to perform system in accordance with various embodiments of the technology. According to a set of embodiments, some or all of the procedures of such methods are performed by the computer system 800 in response to processor 810 executing one or more sequences of one or more instructions, which might be incorporated into the operating system 840 and/or other code, such as an application program 845, contained in the working memory 835. Such instructions may be read into the working memory 835 from another computer-readable medium, such as one or more of the storage device(s) 825. Merely by way of example, execution of the sequences of instructions contained in the working memory 835 might cause the processor(s) 810 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 800, various computer-readable media might be involved in providing instructions/code to processor(s) 810 for execution and/or might be used to store and/or carry such instructions/code. In many embodiments, a computer-readable medium is a physical and/or tangible storage medium. Such a medium may take the form of a non-volatile media or volatile media. Non-volatile media include, for example, optical and/or magnetic disks, such as the storage device(s) 825. Volatile media include, without limitation, dynamic memory, such as the working memory 835.

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 800.

The communications subsystem 830 and/or components thereof generally will receive signals, and the bus 805 then might carry the signals and/or the data, instructions, etc. carried by the signals to the working memory 835, from which the processor(s) 810 retrieves and executes the instructions. The instructions received by the working memory 835 may optionally be stored on a non-transitory storage device 825 either before or after execution by the processor(s) 810.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including embodiments. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a sensor" includes a plurality of sensors, and reference to "the processor" includes reference to one or more processors and equivalents thereof known to those skilled in the art, and so forth. Ordinals such as "first sensor" and "second sensor" only mean they may be different. There is no specific sequence unless the context clearly dictates otherwise. Thus, for example, "first sensor" can be described as "second sensor", and vice versa.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A method for monitoring user activity in a vehicle, the method being implemented by one or more processors configured to execute machine-readable instructions, the method comprising:
   storing, in a storage associated with the vehicle, response information regarding a user of the vehicle, the response information includes mappings between activity groups and corresponding response time duration for the user to regain a control of the vehicle, wherein the mappings include a first mapping between a first activity group and a first response time duration;
   acquiring, from a first sensor in the vehicle, current activity data regarding the user, the current activity data of the user indicating a first current activity engaged by the user in the vehicle;
   generating, using a first set of one or more classifiers, key point data regarding the user, the key point data indicating a first set of body and/or hand and/or eye movement points of the user during the first current activity;
   acquiring, from a second sensor in the vehicle, environment data regarding the vehicle during the first current activity, the environment data includes information regarding an environment surrounding the user during first current activity;
   assigning, using a second set of one or more classifiers, based on the key point data, the first current activity to the first activity group; and
   generating a take-over request for the user to regain the control of the vehicle based on the first mapping and first current activity being assigned to the first activity group and the environment data.

2. The method of claim 1, wherein the first set of one or more classifiers are included in a convolutional neural network (CNN), the CNN including a first branch of a human body part confidence map, and a second branch of human body part affinity field.

3. The method of claim 1, wherein the second set of one or more classifiers are included in a real-time neural network configured to classify a set of body and/or hand and/or eye movement points of the user into a corresponding activity group.

4. The method of claim 1, wherein the first response time duration is a mean time duration for the user to regain the control of the vehicle when engaging an activity in the first activity group.

5. The method of claim 1, wherein generating the take-over request includes generating a first alert for presentation to the user, the first alert includes information facilitating the user to regain the control of the vehicle within the first response time duration.

6. The method of claim 1, wherein the method further comprises determining an actual time duration for the user to regain the control of the vehicle after the take-over request is generated, and updating the first response time duration based on the actual time duration.

7. The method of claim 1, wherein the response information further includes mappings between the activity groups and corresponding stimulus information for the user to regain a control of the vehicle, wherein the mappings includes a second mapping between the first activity group and corresponding first stimulus information, the first stimulus information indicating a first instruction to cause the user to regain the control of the vehicle when engaging the first activity, and wherein generating the take-over request for the user to regain the control of the vehicle is further based on the second mapping and first current activity being assigned to the first activity group.

8. The method of claim 7, wherein generating the take-over request for the user to regain the control of the vehicle includes generating an alert for presentation to the user according to the first instruction.

9. The method of claim 7, wherein the first instruction includes one or more commands for execution by the processor to deactivate or activate an component of the vehicle.

10. The method of claim 1, wherein the environment data includes at least one of cabin noise, cabin temperature, time of day, weather condition, road condition, local condition, and traffic condition.

11. A system for monitoring user activity in a vehicle, the system comprising one or more processors configured to execute machine-readable instructions, wherein when the machine-readable instructions are executed, the one or more processors are caused to perform:
   storing, in a storage associated with the vehicle, response information regarding a user of the vehicle, the response information includes mappings between activity groups and corresponding response time duration for the user to regain a control of the vehicle, wherein the mappings include a first mapping between a first activity group and a first response time duration;
   acquiring, from a first sensor in the vehicle, current activity data regarding the user, the current activity data of the user indicating a first current activity engaged by the user in the vehicle;

generating, using a first set of one or more classifiers, key point data regarding the user, the key point data indicating a first set of body and/or hand and/or eye movement points of the user during the first current activity;

acquiring, from a second sensor in the vehicle, environment data regarding the vehicle during the first current activity, the environment data includes information regarding an environment surrounding the user during first current activity;

assigning, using a second set of one or more classifiers, based on the key point data, the first current activity to the first activity group; and generating a take-over request for the user to regain the control of the vehicle based on the first mapping and first current activity being assigned to the first activity group and the environment data.

12. The system of claim 11, wherein the first set of one or more classifiers are included in a convolutional neural network (CNN), the CNN including a first branch of a human body part confidence map, and a second branch of human body part affinity field.

13. The system of claim 11, wherein the second set of one or more classifiers are included in a real-time neural network configured to classify a set of body and/or hand and/or eye movement points of the user into a corresponding activity group.

14. The system of claim 11, wherein the first response time duration is a mean time duration for the user to regain the control of the vehicle when engaging an activity in the first activity group.

15. The system of claim 11, wherein generating the take-over request includes generating a first alert for presentation to the user, the first alert includes information facilitating the user to regain the control of the vehicle within the first response time duration.

16. The system of claim 11, wherein the method further comprises determining an actual time duration for the user to regain the control of the vehicle after the take-over request is generated, and updating the first response time duration based on the actual time duration.

17. The system of claim 11, wherein the response information further includes mappings between the activity groups and corresponding stimulus information for the user to regain a control of the vehicle, wherein the mappings includes a second mapping between the first activity group and corresponding first stimulus information, the first stimulus information indicating a first instruction to cause the user to regain the control of the vehicle when engaging the first activity, and wherein generating the take-over request for the user to regain the control of the vehicle is further based on the second mapping and first current activity being assigned to the first activity group.

18. The system of claim 17, wherein generating the take-over request for the user to regain the control of the vehicle includes generating an alert for presentation to the user according to the first instruction.

19. The system of claim 17, wherein the first instruction includes one or more commands for execution by the processor to deactivate or activate an component of the vehicle.

20. The system of claim 11, wherein the environment data includes at least one of cabin noise, cabin temperature, time of day, weather condition, road condition, local condition, and traffic condition.

* * * * *